United States Patent [19]

Zorabedian

[11] Patent Number: 5,732,095
[45] Date of Patent: Mar. 24, 1998

[54] DUAL HARMONIC-WAVELENGTH SPLIT-FREQUENCY LASER

[75] Inventor: Paul Zorabedian, Mountain View, Calif.

[73] Assignee: Hewlett-Packard Company, Palo Alto, Calif.

[21] Appl. No.: 717,386

[22] Filed: Sep. 20, 1996

[51] Int. Cl.$^6$ ........................................ H01S 3/10
[52] U.S. Cl. ..................... 372/22; 372/105; 372/98; 372/92
[58] Field of Search .......................... 372/22, 19, 105, 372/92, 6, 21

[56] References Cited

U.S. PATENT DOCUMENTS

| | | | |
|---|---|---|---|
| 5,047,668 | 9/1991 | Bosenberg | 372/21 |
| 5,381,427 | 1/1995 | Wedekind et al. | 372/105 |
| 5,404,222 | 4/1995 | Sparta . | |
| 5,617,246 | 4/1997 | Hiro | 372/105 |

FOREIGN PATENT DOCUMENTS 0194940  3/1996  European Pat. Off. .

OTHER PUBLICATIONS

Measurement of the changes in air refractive index and distance by means of a two–color interferometer, by Hirokazu Matsumoto, Yucong Zhu, Shigeo Iwasaki, and Tadanao O'ishi Applied Optics, vol. 31, No. 22, 1 Aug., 1992 (pp. 4522–4526).

A "Twisted–Mode" Technique for Obtaining Axially Uniform Energy Density in a Laser Cavity by V. Evtuhov and A. E. Siegman, Applied Optics, vol. 4, No. 1, Jan. 1965 (pp. 142 & 143).

Second–harmonic interferometers by F. A. Hopf, A. Tomita, and G. Al–Jumaily, Optics Letters, vol. 5, No. 9, Sep. 1980 (pp. 386–387).

A Two–Hundred–Foot Yardstick with Graduations Every Microinch by John N. Dukes and Gary B. Gordon, Hewlett–Packard Journal, Aug. 1970, vol. 21, No. 12 (pp. 1–16).

The Refractive Index of Air by Bengt Edlen, Metrologia, vol. 2, No. 2, 1966 (pp. 71–80).

Interferometers AC vs DC, by John F. Beckwith, Late Oct. 1982, Sep. 1, 1982 (pp. 1–22).

*Primary Examiner*—Leon Scott, Jr.
*Attorney, Agent, or Firm*—Pamela Lau Kee

[57] ABSTRACT

The ideal source for air-turbulence-corrected distance-measuring interferometry is a single laser that generate overlapping beams at two widely separated wavelengths $\lambda_1$ and $\lambda_2$. At least one of the wavelengths, as well as the wavelength ratio, must be known to high degrees of accuracy. Furthermore, at each wavelength, the laser should produce a pair of orthogonally polarized frequencies with a frequency splitting that is adjustable over the range of approximately 0.5 MHz to 20 MHz to facilitate AC interferometric distance measurements with a variety of measurement-mirror velocities.

16 Claims, 10 Drawing Sheets

DUAL HARMONIC-WAVELENGTH SPLIT-FREQUENCY LASER

FIELD OF THE INVENTION

The present invention is directed towards the field of interferometry, in particular, the area of distance-measuring interferometry.

BACKGROUND OF THE INVENTION

Interference phenomena with laser beams is used to make highly accurate displacement measurements, such as in the control of wafer steppers used in integrated circuit (IC) manufacturing. In a distance-measuring laser interferometer, light from a laser source is split into two beams. The reference beam is reflected from a stationary reference mirror, while the measurement beam is reflected from a moving measurement mirror. The beams are recombined at a detector where their wavefloats interfere. The optical intensity of the combined wavefront depends on the differential optical length between the reference and measurement paths. A change in differential optical path length of $\lambda/m$ causes one fringe of interference, where m is the number of passes the light makes between the beam splitter and the measurement mirror. The change in optical intensity of the combined wavefront is converted to an electrical signal by the detector. The detector signal is processed to determine the total change in the optical length of the measurement path, and thus the total position change in the measurement mirror, by counting the fringes of the signal. Through interpolation, optical path length measurement precision much greater than $\lambda/m$ can be obtained.

Two types of distance-measuring interferometers are: DC and AC. In a DC interferometer, the laser emits a single frequency. Only when the measurement mirror is moving is the interference signal time-varying, due to the Doppler effect. When the measurement mirror is stationary, the interference signal is a constant. Disturbances such as laser power drift and electronic noise can be easily misinterpreted as a motion signal, especially when the measurement mirror is stationary. In an AC interferometer, the laser emits two optical frequencies with orthogonal polarizations. The frequencies are separated with a polarization-dependent beam splitter, with one frequency going to the reference mirror and the other going to the measurement mirror. Thus, the detector generates an AC signal when the measurement mirror is stationary as well as when it is moving. It is easier to retect noise with a time-varying signal than with a constant one. Therefore, AC interferometry is more accurate than DC due to its superior ability to reject noise.

In "A two-hundred foot yardstick with graduations every microinch," Hewlett-Packard Journal, v.21, p.203 (1970), Dukes, et al. used an AC interferometer system to make precise distance measurements. For IC manufacturing, the quantity of interest is the geometrical length d. The laser interferometer measures optical path length 1, which is related to d by $$l = \int n(z)dz = d\left(\frac{\int n(z)dz}{d}\right) = d\bar{n} \quad (1)$$

where n(z) is the index of refraction of the ambient medium (usually air) expressed as a function of position, and $\bar{n}$, the value averaged along the measurement path. The laser interferometer measurement must be corrected for the refractive index of air, which is assumed to be spatially constant. In practice, the air along the measurement path may be turbulent, particularly in the region surrounding the wafer stage of a stepper. Air turbulence can lead to serious position-measurement errors as the feature sizes of ICs shrink.

The refractive index of air depends on the density of air and wavelength, as shown in Equation 2:

$$n(\lambda,r) = 1 + \alpha(\lambda)\rho(r) \quad (2)$$

$\alpha(\lambda)$ is the refractivity of air expressed as a function of wavelength. The quantity $\rho(r)$ is the local air density expressed as a function of position. The optical path length is measured at two widely-separated wavelengths: $\lambda_1$ and $\lambda_2$, where the index of refraction is different due to dispersion. These measurements relate the geometrical distance d to the air density averaged over the measurement path $\bar{\rho}$, as shown in Equations 3a and 3b:

$$l(\lambda_1) = d(1 + \alpha(\lambda_1)\bar{\rho}) \quad (3a)$$

$$l(\lambda_2) = d(1 + \alpha(\lambda_2)\bar{\rho}) \quad (3b)$$

When the refractivities at the two wavelengths are known, the geometrical distance d is:

$$d = \frac{l(\lambda_1)}{1 - \Gamma\left(1 - \frac{l(\lambda_1)}{l(\lambda_2)}\right)} \quad (4)$$

where $$\Gamma = \frac{\alpha(\lambda_1)}{\alpha(\lambda_2) - \alpha(\lambda_1)} \quad (5)$$

For interferometry, Equations 3a and 3b become:

$$F_1 \frac{\lambda}{m} = d(1 + \alpha(\lambda_1)\bar{\rho}) \quad (6a)$$

$$F_2 \frac{\lambda}{m} = d(1 + \alpha(\lambda_2)\bar{\rho}) \quad (6b)$$

and $$d = \left[F_1 \frac{\lambda_1}{m}\right] \left\{ \frac{1}{1 - \Gamma\left(1 - \frac{\lambda_1 F_1}{\lambda_2 F_2}\right)} \right\} \quad (7)$$

where $F_1$ and $F_2$ are the fringe counts that are generated by processing the interference signals at wavelengths $\lambda_1$ and $\lambda_2$, respectively. The factor in square brackets represents the first-order estimate of the geometrical length. To ensure accuracy, the wavelength $\lambda_1$ must be accurately known. For accuracy in the correction factor (shown in curly braces), the wavelength ratio $\lambda_1/\lambda_2$ must be accurately known. One way is for the wavelengths to be harmonically related. For example, if $\lambda_2$ is the second-harmonic wavelength of $\lambda_1$, then the wavelength ratio is identically equal to 2.

Another method to measure precise distance measurements is the three color method. The optical path length is independently measured at three wavelengths: $\lambda_m$, $\lambda_{c1}$, and $\lambda_{c2}$. The measurement wavelength $\lambda_m$ is delved from a HeNe laser and is accurately known. The correction wavelengths $\lambda_{c1}$ and $\lambda_{c2}$ are harmonically related and are generated from a Nd:YAG laser. The geometrical distance can be expressed as:

$$d = [l(\lambda_m)] \left\{ \cfrac{1}{1 - \Gamma \left(1 - \cfrac{l(\lambda_{c1})}{l(\lambda_{c2})}\right)} \right\} \quad (8)$$

where $$\Gamma = \frac{\alpha(\lambda_{c1})}{\alpha(\lambda_{c2}) - \alpha(\lambda_{c1})} \quad (9)$$

One variation on the prior art three color method was disclosed by Lis in U.S. Pat. No. 5,404,222. The system includes a He-Ne laser operating at a measurement wavelength $\lambda_m$ and a Nd:YAG fundamental and second harmonic laser operating over the same measurement path at wavelengths $\lambda_{c1}$ and $\lambda_{c2}$. The difference in the optical tenth of the measurement path at the two correction wavelengths is measured as follows:

$$d = l(\lambda_m) - \frac{\alpha(\lambda_m)}{\alpha(\lambda_{c2}) - \alpha(\lambda_{c1})} (l(\lambda_{c2}) - l(\lambda_{c1})) \quad (10)$$

A Taylor series exposion of Equation 8 is shorn to be equal to Equation 10 to first order in the air pressure. The system is costly, consumes needed space, and generates heat. The last two are critical issues in stepper systems. In addition, there is poor signal-to-noise in the second-harmonic interferometer because the nonlinear wavelength conversions are performed outside of the laser cavity, and so are inefficient.

Sommargren, in U.S. Pat. No. 4,684,828, used a single frequency, linearly polarized linear beam to achieve a high efficiency beam with two, orthogonal polarized frequencies. For AC interferometry, a frequency split of several MHz is required at each wavelength. Using an acousto-optic modulator (AOM) provides a frequency shift of several tens of MHz to ~100 MHz. Two AOMs driven at different RF frequencies must be used at each wavelength, their frequency difference giving the desired splitting. The cost, space, and opto-mechanical complexity required is considerable.

A laser that simultaneously generates two overlapping beams at harmonically-related wavelengths, with a frequency splitting of several MHz between orthogonal-polarizations at each wavelength is desirable.

SUMMARY OF THE INVENTION

A single laser that generates two overlapping beams at two widely separated wavelengths, both of which are known to high degrees of absolute accuracy, provides an ideal source for air-turbulence corrected distance measuring interferometry. At each wavelength, the laser produces a pair of orthogonally polarized frequencies with a frequency split adjustable over the range of ~0.5-20 MHz to facilitate AC interferometry with a variety of measurement-mirror velocities.

A laser in a twisted mode configuration includes two non-linear crystals for intra cavity frequency doubling. Two doubling crystal stages are positioned in series between an output mirror and a first quarter waveplate. A gain medium is positioned between the first quarter waveplate and a second quarter waveplate. A mirror is positioned between the second quarter waveplate and coupling optics. The gain medium is further coupled to a pump source.

DETAILED DESCRIPTION OF THE DRAWINGS

Figure 1:
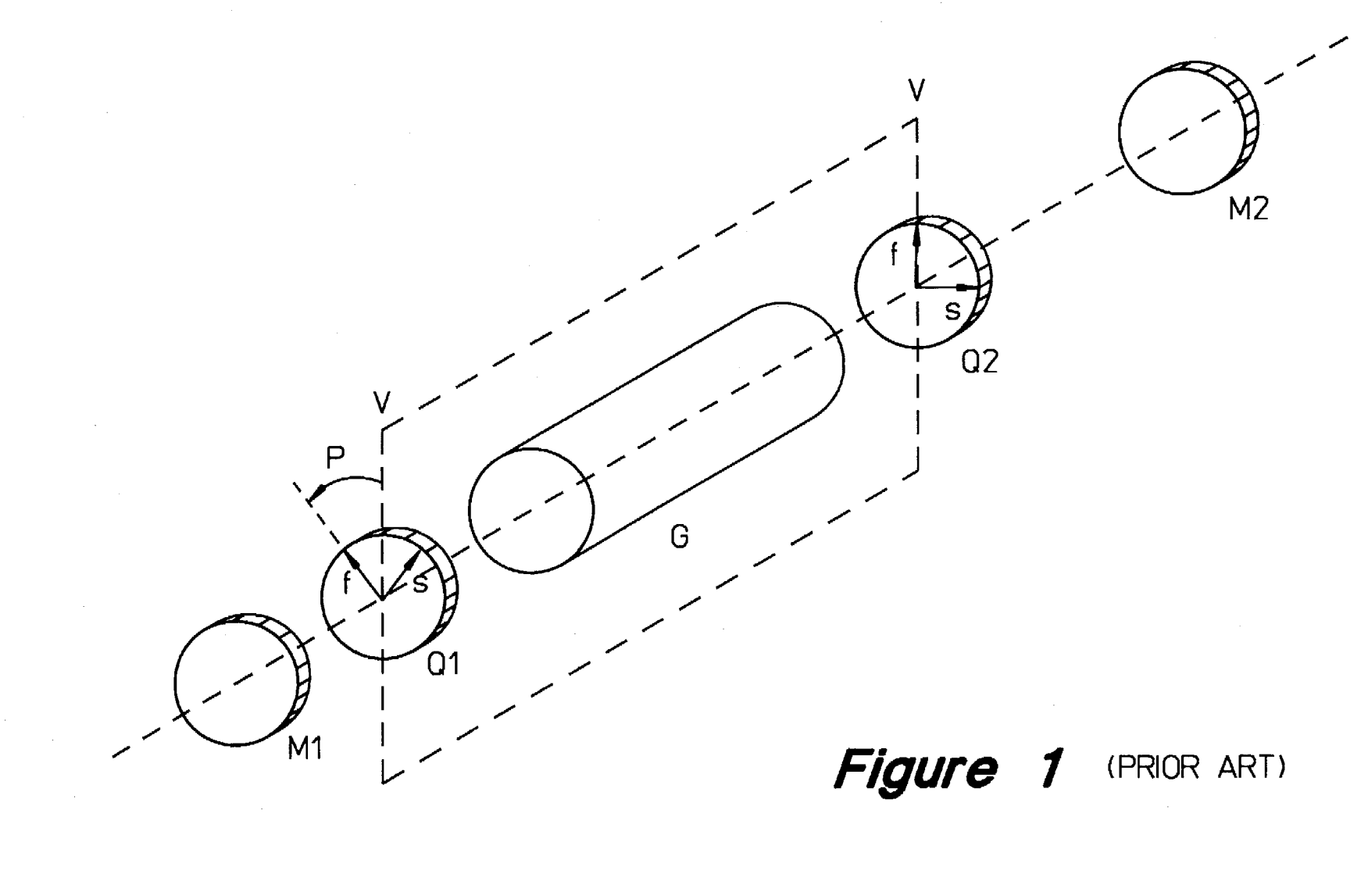
FIG. 1 illustrates a prior art twisted mode laser.

FIG. 1 illustrates a prior art twisted mode laser. The quarter wave plates (QWPs) are rotated about the optical axis of the cavity so that their fast axes are offset by an angle $\phi$. When the gain medium is driven with enough pump power so that its gain overcomes the intra cavity losses, the laser may oscillate at multiple wavelengths within the bandwidth of the gain medium provided that the optical frequencies coincide to the axial mode spectrum of the cavity. The laser has two sets of axial mode frequencies: $v^+_q$ and $v^+_q$ These frequencies are given by $$v_q^+ = \frac{c}{2L}\left(q + \frac{\Delta v_{split}}{2}\right) \quad (11a)$$

$$v_q^- = \frac{c}{2L}\left(q - \frac{\Delta v_{split}}{2}\right) \quad (11b)$$

where q is an integer, c is the speed of light, and L is the optical path length of the cavity. The optical path length is the sum of the product of the refractive index times the geometrical length of each element in the cavity including the air spaces. $\Delta v_{split}$, the splitting between the two sets of modes, is governed by the angular offset angle $\phi$ between the QWPs:

$$\Delta v_{split} = v_q^+ - v_q^- = \frac{c}{2L} \frac{2\phi}{\pi} \quad (12)$$

The splitting can vary from 0 when $\phi=0°$ to a maximum of c/4L when $\phi=45°$. For a typical cavity length of L=10 cm, c/2L=1.5 GHz. A frequency splitting of 10 MHz is obtained by setting $\phi=0.6°$.

Using Jones matrix calculus, the polarizations of the 2 sets of modes are shown to be orthogonally polarized with respect to each other. In the region between the QWPs, one set of modes (the "+" set) is right circularly polarized (rcp) traveling to the right and left circularly polarized (lcp) traveling to the left. The other set of modes (the "−" set) is lcp traveling to the right and rcp traveling to the left. In the regions between the QWPs and the adjacent mirrors the two sets of modes are linearly polarized at 90° to each other and at −+45° with respect to the fast axis of the adjacent QWP.

One method for mode control is to place a linear polarizer between one of the mirrors and the adjacent QWP in order to suppress one complete set of modes and eliminate spatial hole eburning. Between the QWPs, each mode of the surviving set would have a uniform intensity and a linear polarization that twisted in space.

Figure 2:
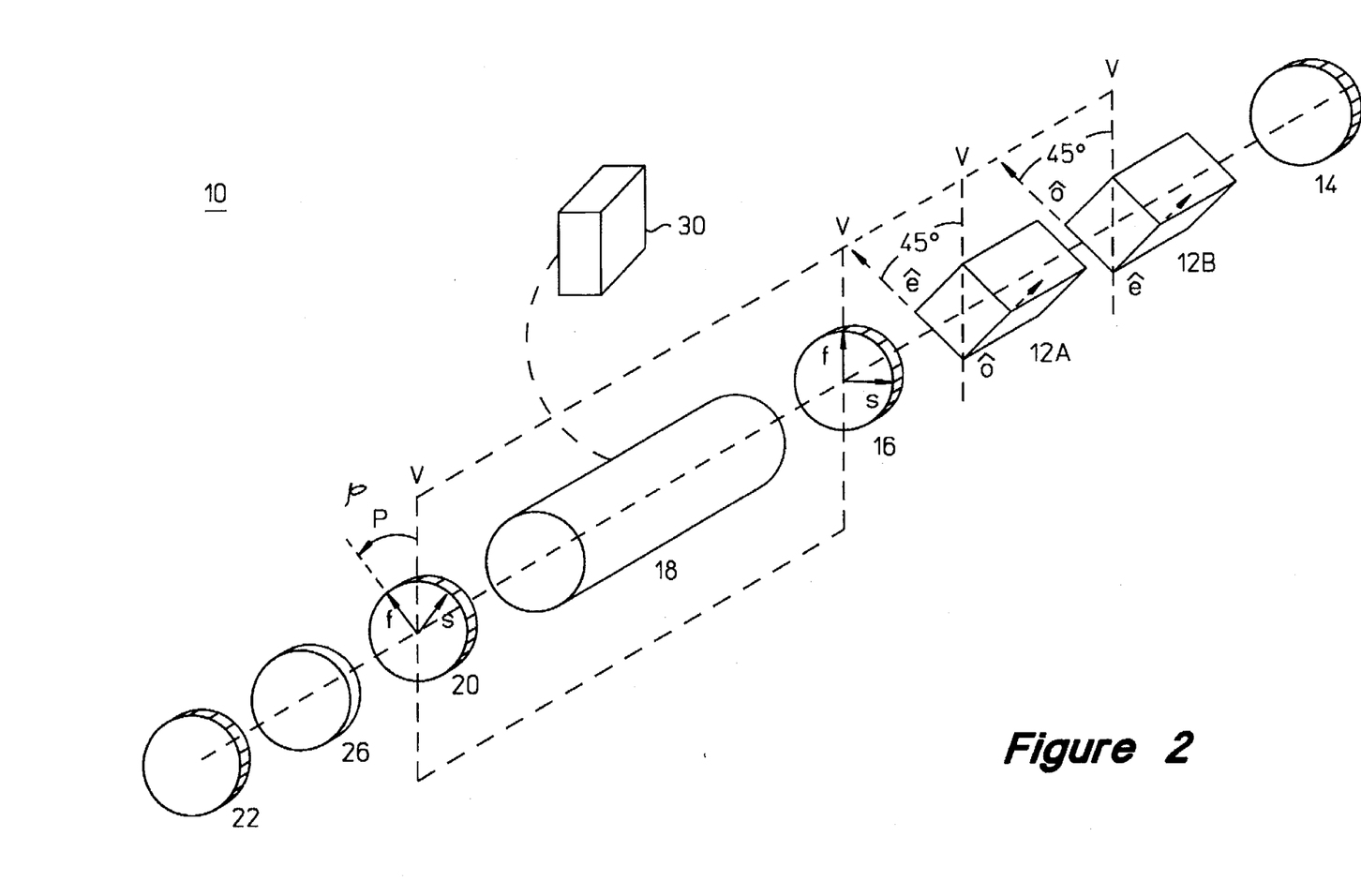
FIG. 2 illustrates a laser of the present invention.

FIG. 2 illustrates a laser 10 of the present invention. Two doubling crystal stages 12A, 12B are positioned in series between a first mirror 14 and a first QWP 16. A gain medium 18 is positioned between the first QWP 16 and a second QWP 20. The ê axis of the first doubling stage 12A being at +45° to and the ê axis of the second doubling stage 12B being at −45° to the fast axis of the second QWP 20. Each QWP has a retardation of $\lambda$/4 at the fundamental wavelength: their fast axes are rotated about the beam axis by an angle $\phi$ with respect to each other. A pump source 30 couples energy into the gain medium 18. A second mirror 22 is positioned between the second QWP 20. A mode selector 26, is located between the second mirror 22 and the first QWP 20.

The mode selector 26, preferably etalon, may be located anywhere within the cavity. Mode selection permits the laser to oscillate in a single pair of modes $v^+_q$ and $v^-_q$, with a unique value of q, that are separated by several MHz (on the order of 1–10 MHz), while suppressing all other pairs of modes that are on the order of a few GHz or more away. The single pair of modes are the fundamental frequencies $v_{f1}$ and $v_{f2}$. Birefringent filters and diffraction gratings may alternatively be used for mode selection. The laser must generate the second-harmonic frequencies of the two fundamental frequencies: $v_{sh1}=2v_{f1}$ and $v_{sh2}=2v_{f2}$. Second-harmonic generation occurs by using the doubling crystal stages for intra cavity frequency doubling.

The second mirror 22 has a high reflectance at the fundamental wavelength. The characteristics of the first mirror 14 at the fundamental wavelength are such as to feed back most of the light (e.g. 98–99% reflectance) and also to allow a small output coupling (e.g. 1–2% transmittance). At the second harmonic wavelength, the second mirror has a high transmittance (e.g. >80%). Multi-layer dielectric coatings can be readily designed and deposited on transparent substrates to provide such spectral characteristics. To increase the absolute wavelength accuracy to the order of 1 part in $10^8$, a wavelength stabilization loop, incorporating one of a number of well-known saturation spectroscopy methods, may be added to the laser.

Optical second-harmonic generation is a special case of optical sum-frequency generation. Figuratively, one photon at frequency $v_1$ and one photon at frequency $v_2$ are annihilated while simultaneously a photon at frequency is generated at frequency $v_3$.

$$v_3 = v_1 + v_2 \tag{13}$$

Equation 13 is a statement of energy conservation for this frequency conversion process. This effect depends on very weak nonlinear optical properties of materials. The intensity of the generated beam at frequency $v_3$ is proportional to the product of the intensities of the beams at frequencies $v_1$ and $v_2$, i.e.

$$I(v_3) \propto d I_1(v_1) I_2(v_2) \tag{14}$$

where d is a constant of proportionality that depends on the properties of the nonlinear crystal, the propagation directions and polarizations of the beams, and their interaction lengths. The interaction of intense optical fields in a nonlinear crystal of at least a few millimeters length is required for a significant amount of energy conversion. In addition, the sum-frequency-generation process must meet the condition of phase matching, shown in Equation 15

$$k_1 + k_2 = k_3 \tag{15}$$

where the $k_i$ are the optical wave vectors of the interacting beams. The wave vector magnitudes are related to the optical frequencies by $$|k_i| = \frac{2\pi v_i n_i}{c} \tag{16}$$

The quantity $n_i$ is the index of refraction experienced by the beam at frequency $v_i$ inside the nonlinear crystal.

Figure 3A:
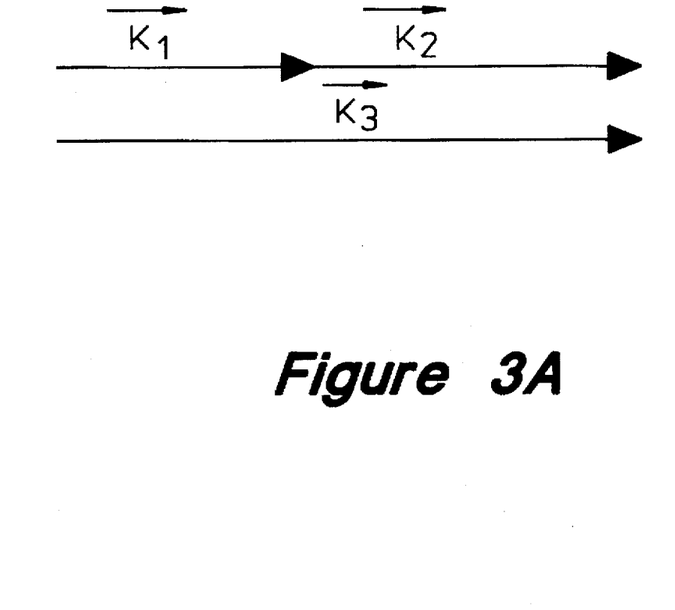
FIGS. 3A and 3B illustrates collinear and non-collinear phase matching.
Figure 3B:
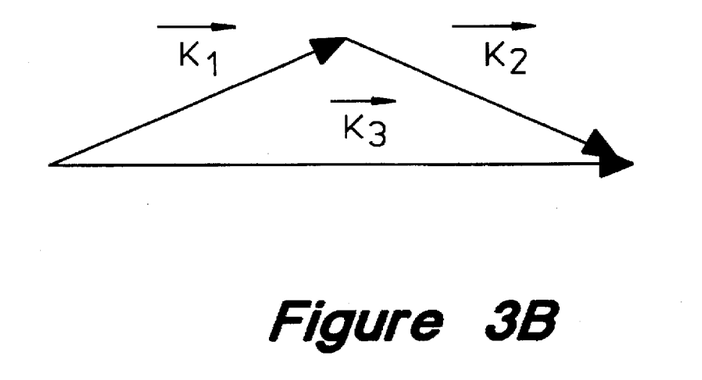

Equation 15 expresses a vector relationship. The vectors may either be collinearly or non-collinearly phasematched, as shown in FIGS. 3A and 3B, respectively. Collinear phase matching is preferred because the tightly focused beams to remain overlapped for long distances. In the collinear case, the phase matching condition becomes $$v_1 n_1 + v_2 n_2 = v_3 n_3 \tag{17}$$

The present invention is specifically concerned with second harmonic generation: $v_1 = v_2 = v_f$ and $v_3 = v_{sh} = 2v_f$. For an isotropic crystal, Equation 17 then becomes $n_f = n_{sh}$. However, the frequencies involved are widely separated. For example, if $v_f$ is in the near infrared, $V_{sh}$ is in the visible. Since the crystal must be transparent at these frequencies, its refractive index will exhibit normal dispersion, which prevents phase matching in isotropic crystals.

Phase matching can be performed in anisotropic, birefringent crystals. By properly selecting the propagation directions and polarizations of the interacting beams, birefringence can be used to exactly compensate the effect of dispersion, thereby meeting the phase matching condition and improving nonlinear conversion efficiencies.

The refractive index properties of any crystal is described by the three principal indices of refraction $n_x$, $n_y$, and $n_z$. In isotropic crystals, all three principal indices are equal. Otherwise the crystal is birefringence. If two principal indices are equal, the crystal is called uniaxial. When all three principal indices have different values, the crystal is called bi-axial.

The propagation of the wavefront of an optical beam is described by the phase velocity vector and a group velocity vector. The phase velocity vector, indicative of the velocity of the wavefronts, is:

$$v_p = \frac{2\pi v}{k^2} k \tag{18}$$

The magnitude of the phase velocity is $$|v_p| = \frac{c}{n} \tag{19}$$

The group velocity vector, indicative of the direction and velocity of energy flow: $v_g = 2\pi \nabla_k v(k) + tm$ (20) In an isotropic crystal, $v_p$ and $v_g$ are parallel. This is not in general the case in birefringent crystals except for certain particular directions of propagation. The state of polarization of an optical beam is generally not preserved as it propagates through a birefringent crystal. For any direction of propagation, there are always two orthogonal directions of linear polarization (eigenpolarizations) and two respective indices of refraction (eigenindices). An incident beam that is initially linearly polarized parallel to either eigenpolarization direction will propagate with its polarization unperturbed through the crystal, with a phase velocity determined by Equation 19 using the corresponding eigenindex of refraction.

Figure 4:
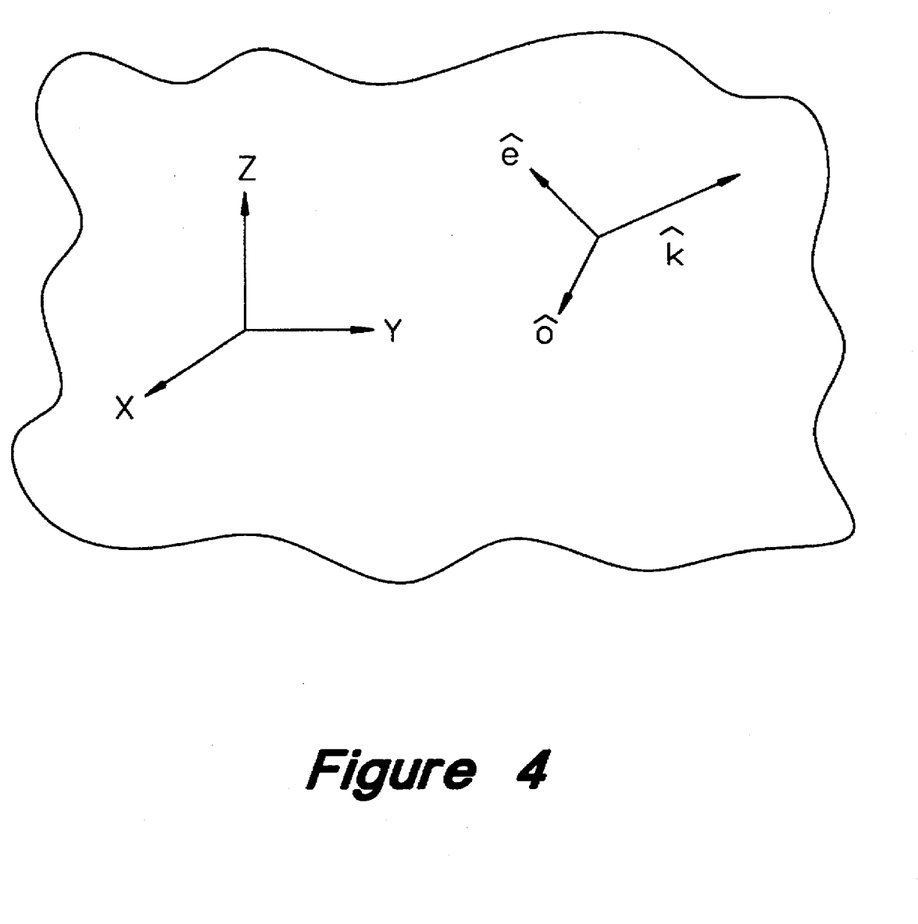
FIG. 4 illustrates the eigenpolarizations.

The two eigenpolarizations are called the ordinary and extraordinary polarizations, and the corresponding eigenindices are often called the ordinary index of refraction $n_o$ and the extraordinary index of refraction $n_e$. The phase and group velocity vectors of the ordinary beam are parallel, so that it propagates as it "ordinarily" would in an isotropic crystal. In contrast, the phase and group velocity vectors of the extraordinary beam are not in general parallel, so that it exhibits "extraordinary" properties. Furthermore, in many crystals the value of no does not depend on propagation direction whereas the value of $n_e$ does depend on propagation direction. FIG. 4 illustrates the ordinary (ô) and extraordinary (ê) eigenpolarization axes for a particular arbitrarily-chosen propagation direction inside a birefringent crystal.

The directional dependence of the extraordinary index is expressed as $n_e(\theta, \phi)$, where $\theta$ and $\phi$ indicate the orientation of the direction of propagation with respect to the z principle axis of the crystal. Corresponding to the two eigenindices of refraction, there are two wave vector magnitudes given by Equation 16:

$$k_o = \frac{2\pi v}{c} n_o \quad (21a)$$

and $$k_e(\theta,\phi) = \frac{2\pi v}{c} n_e(\theta,\phi) \quad (21b)$$

There are two commonly used techniques for utilizing the eigenpolarization states of a birefringent crystal to satisfy the phase matching condition required in order to achieve efficient second harmonic generation: Type 1 and Type 2. In Type 1 phase matching, the fundamental and second harmonic beams are orthogonally polarized while in Type 2, their polarizations are not orthogonal. Type 1 phase matching is desirable because it is desirable for the polarizations of the $k_1$ and $k_2$ fundamental beams to be identical and oriented in either the ordinary or extraordinary directions, while the generated second harmonic beam has the orthogonal polarization to the fundamental beams (either, extraordinary or ordinary, respectively). For example, in a crystal with negative birefringence ($n_o > n_e$), phase matching is achieved by using the ordinary polarization for the fundamental and the extraordinary polarization for the second harmonic in order to satisfy the phase matching condition thus:

$$k_{o1} + k_{o2} = k_{e3}(\theta,\phi) \quad (22)$$

The process described in Equation 22 is called "ooe" Type 1 phase matching. If the crystal has positive birefringence ($n_o < n_e$) the polarizations of the fundamental and second harmonic are reversed in order to satisfy the phase matching condition as follows:

$$k_{e1}(\theta,\phi) + k_{e2}(\theta,\phi) = k_{o3} \quad (23)$$

Figure 5A:
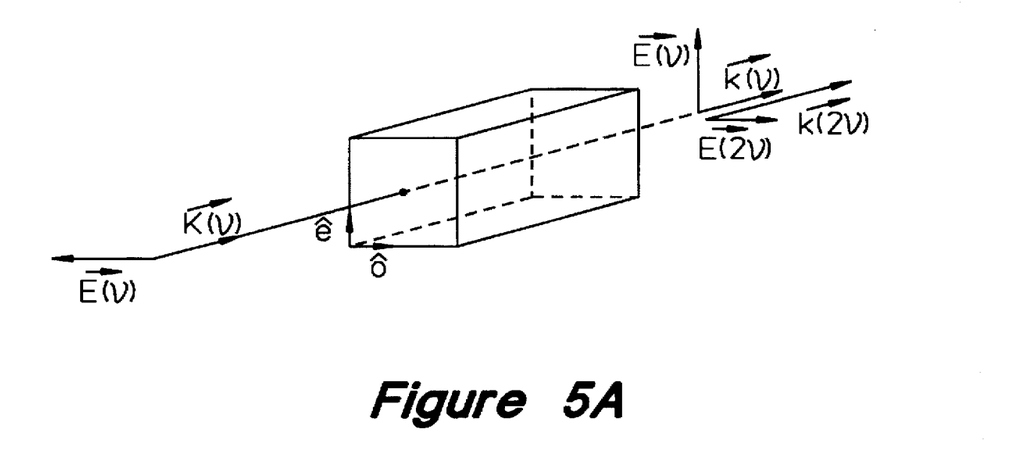
FIGS. 5A and 5B illustrate Type I phasematching.
Figure 5B:
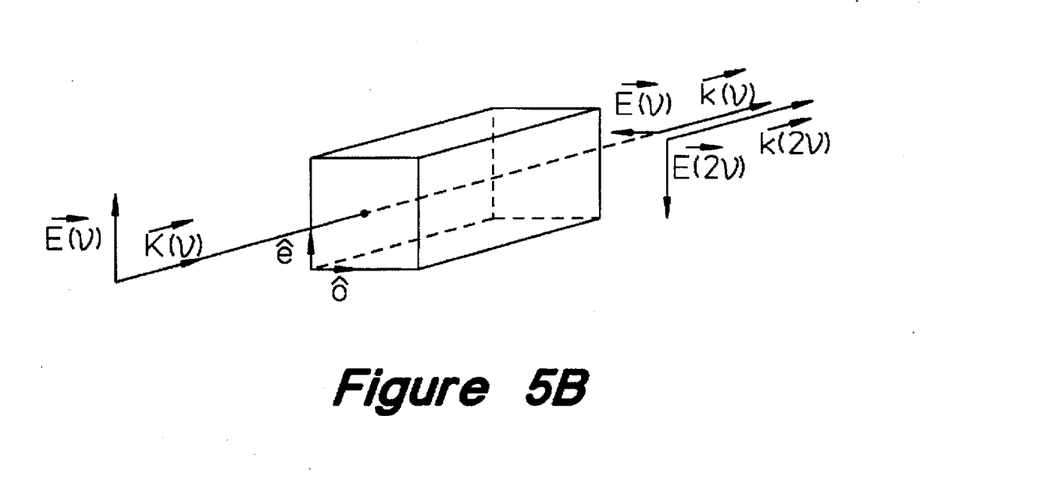

The process described in Equation 23 is called "eeo" Type 1 phase matching. For any particular crystal, only one of these two processes (ooe or eeo) will produce phase matching. The choice depends on the sign of the birefringence as indicated above. One switches from one process to the other simply by rotating the fundamental polarization by 90° about the wave vector direction. The two polarization configurations for Type 1 phase matching are illustrated in FIGS. 5a and 5b.

The invention orients the eigenpolarization directions of pairs of intra cavity Type 1 doubling crystals relative to the orthogonal linear polarizations of the fundamental beams so that only the second harmonic frequencies will be generated.

Figure 6:
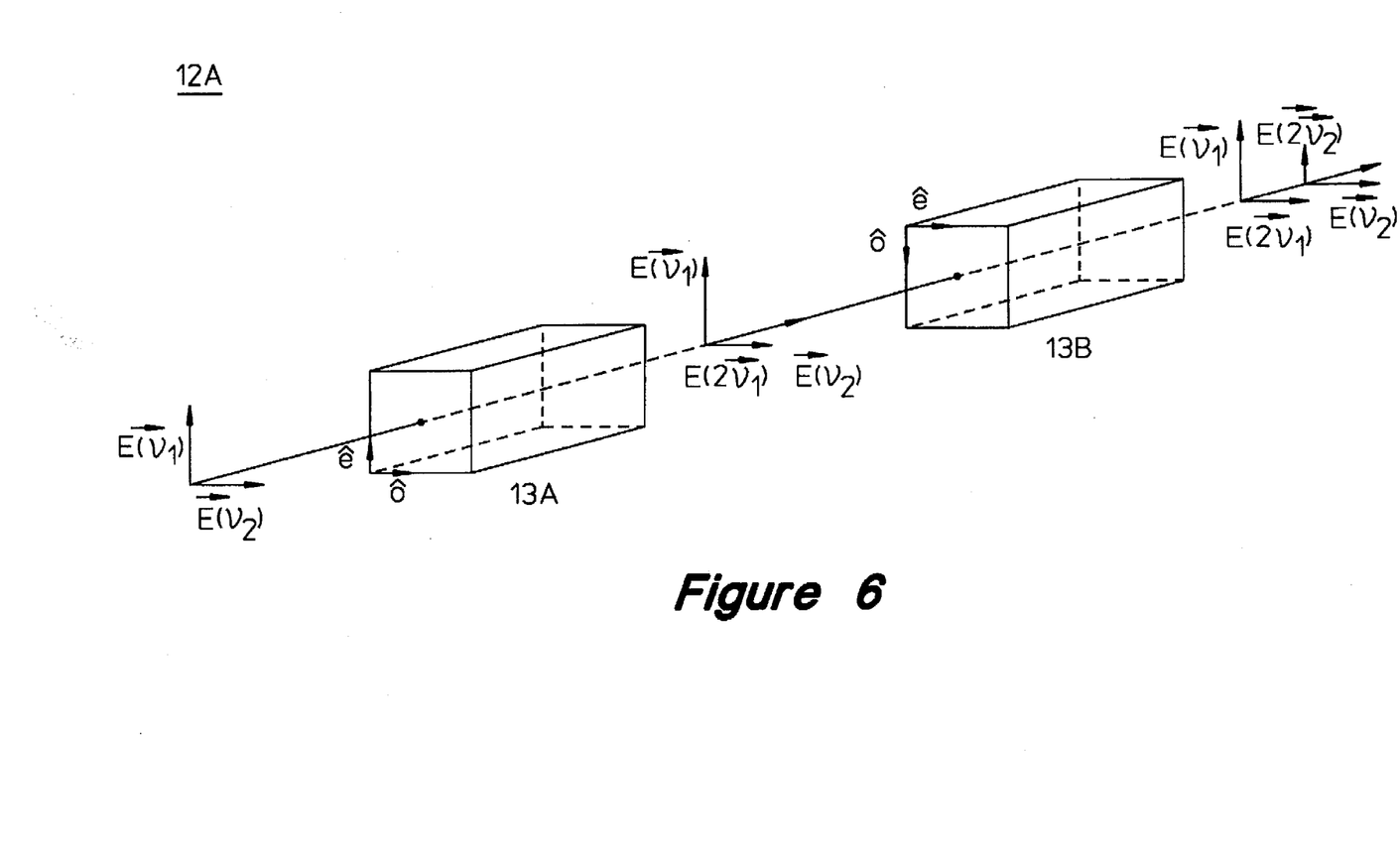
FIG. 6 illustrates the doubling stage shown in FIG. 2.

FIG. 6 illustrates the doubling crystal stages 12A, 12B shown in FIG. 2. Two doubling crystals 12A, 12B are positioned one behind the other along the path of the fundamental beams. Each doubling crystal stage 12A, 12B includes one or more Type 1 second harmonic crystals, such as magnesium-oxide-doped lithium niobate ($MgO:LiNbO_3$) or lithium triborate (LBO) which exhibits "walkoff".

If the crystals have positive birefringence (eeo phase matching), the first crystal generates a beam at $v_{sh1}=2v_{f1}$ and transmits the $v_{f2}$ beam and the unconverted portion of the $v_{f1}$ and $v_{f2}$ beams. The second crystal generates a beam at $v_{sh2}=2v_{f2}$ and transmits the $v_{sh1}$ beam along with the unconverted portions of the $v_{f1}$ beam and the unconverted portion of the $v_{f1}$ beam. If the crystals have negative birefringence (ooe phase matching), the order in which the second harmonics are generated and the directions of their polarizations are reversed. FIG. 6 illustrates the "eeo" configuration of field polarizations and crystal orientations.

In birefringent crystals, the group velocity vector $v_{ge}$ of the extraordinary beam is not parallel to the group velocity vector $v_{go}$ of the ordinary beam except for certain particular directions of the wave vector in the crystal. This non-collinearity causes double refraction in crystal optics. The ordinary and extraordinary beams are angularly divergent inside the crystal. As they undergo refraction upon exiting the crystal, they become parallel but laterally offset. In Type 1 harmonic generation, the effect leads to the angular divergence ρ of the fundamental and second harmonic beams inside the crystal and is called walkoff If walkoff is present, the fundamental and second harmonic beams exiting will be laterally offset. Walkoff reduces the second harmonic conversion efficiency because the distance over which the beams remain overlapped is reduced.

Figure 7:
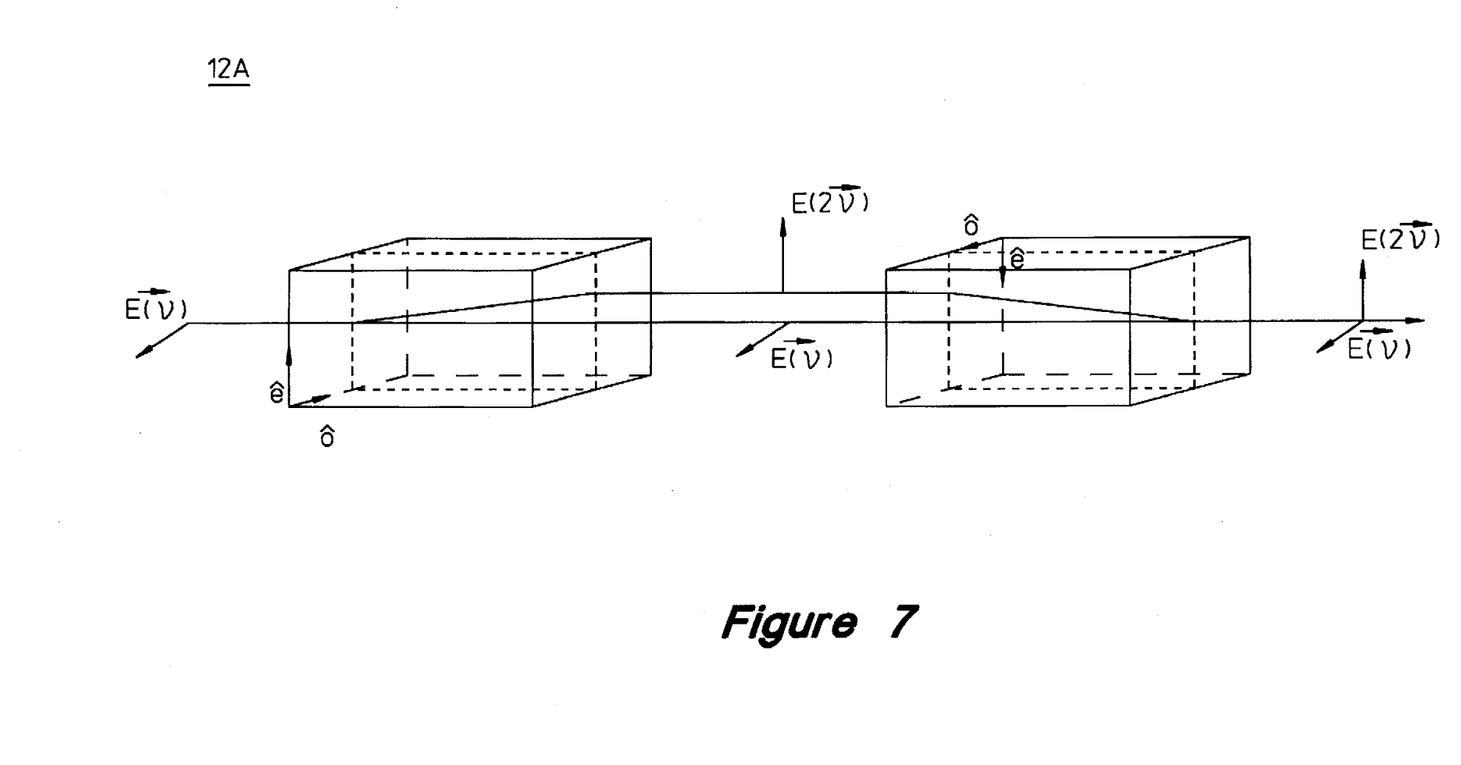
FIG. 7 illustrates "walk-off".

In air-turbulence compensation, since the beams at $\lambda_f$ and $\lambda_{sh}$ should sample identical air paths for the compensation scheme to be maximally effective, lateral beam separation is undesirable. In "technique for enhanced second harmonic output power", Optics Communication, v. 76, pp.250–252 (1990), Samanta, et al. taught that the walkoff direction can be reversed by rotating the ê axis crystal by 180° about the wave vector axis, as shown in FIG. 7. By using a pair of doubling crystals of length L/2 with their ê axes flipped by 180° relative to each other for one of the doubling stages 12A, 12B, more second harmonic power and less lateral separation between the fundamental and second harmonic beams can be obtained than with a single crystal of length L. Alternatively, a doubling stage may include a series of pairs of doubling crystals.

Figure 8:
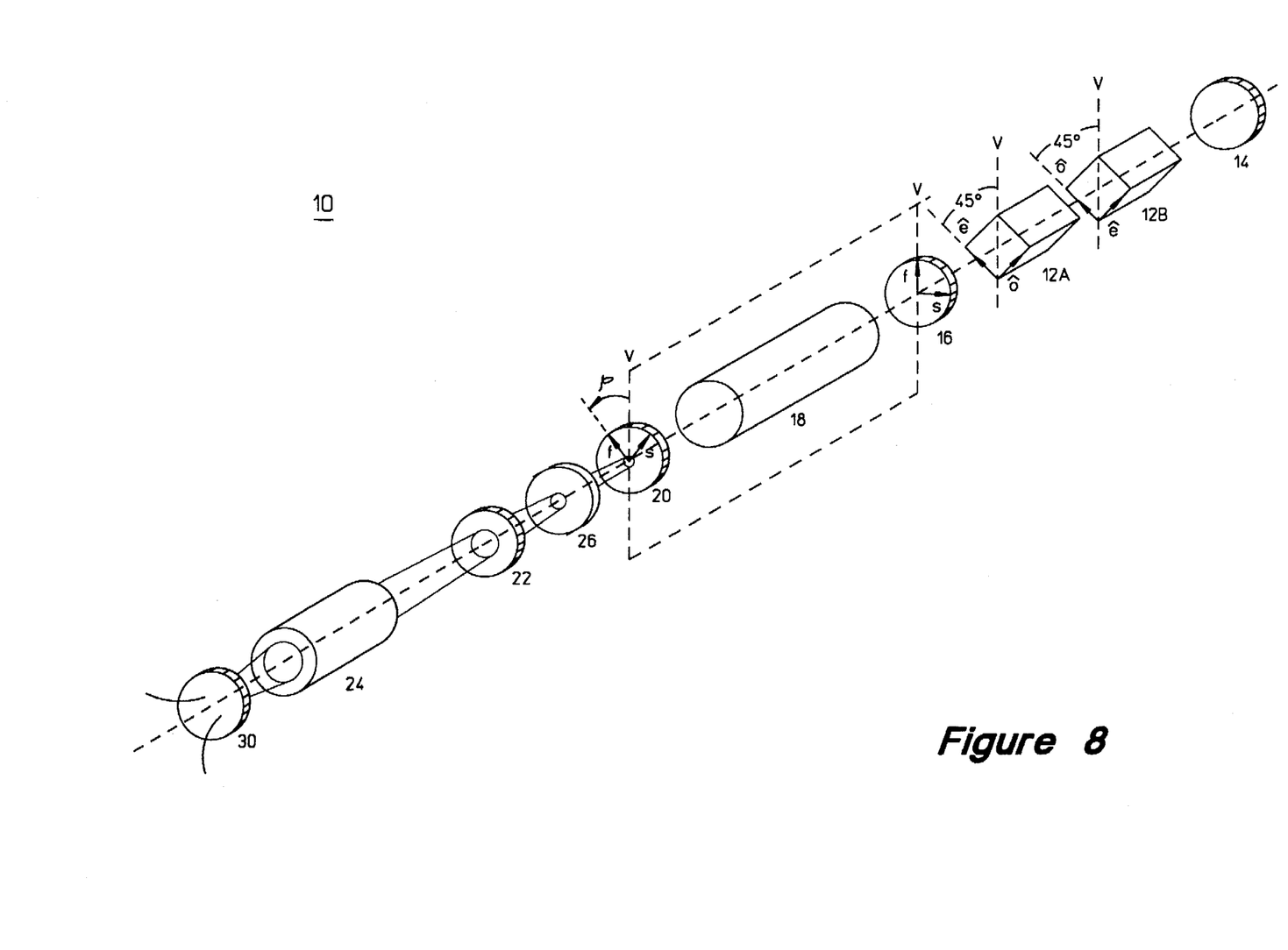
FIG. 8 illustrates another embodiment of FIG. 2.

FIG. 8 illustrates a variation of FIG. 2. The gain medium 18 is a Nd:YAG crystal having polarization-independent gain and which is oriented so that it is non-birefringent for light traveling in the direction of the intra cavity beam. The Nd:YAG is optically pumped in an axial configuration by a pump laser diode 30 whose emission wavelength overlaps the absorption band of Nd:YAG at 808 nm. The pump light is focused into the Nd:YAG crystal through the second mirror, mode selector, and second QWP by a coupling optical system 24 containing components such as lenses and prisms. The second mirror 22 is highly reflecting at the Nd:YAG fundamental wavelength of 1064 ran and highly transmitting at the pump wavelength of 808 nm.

Figure 9:
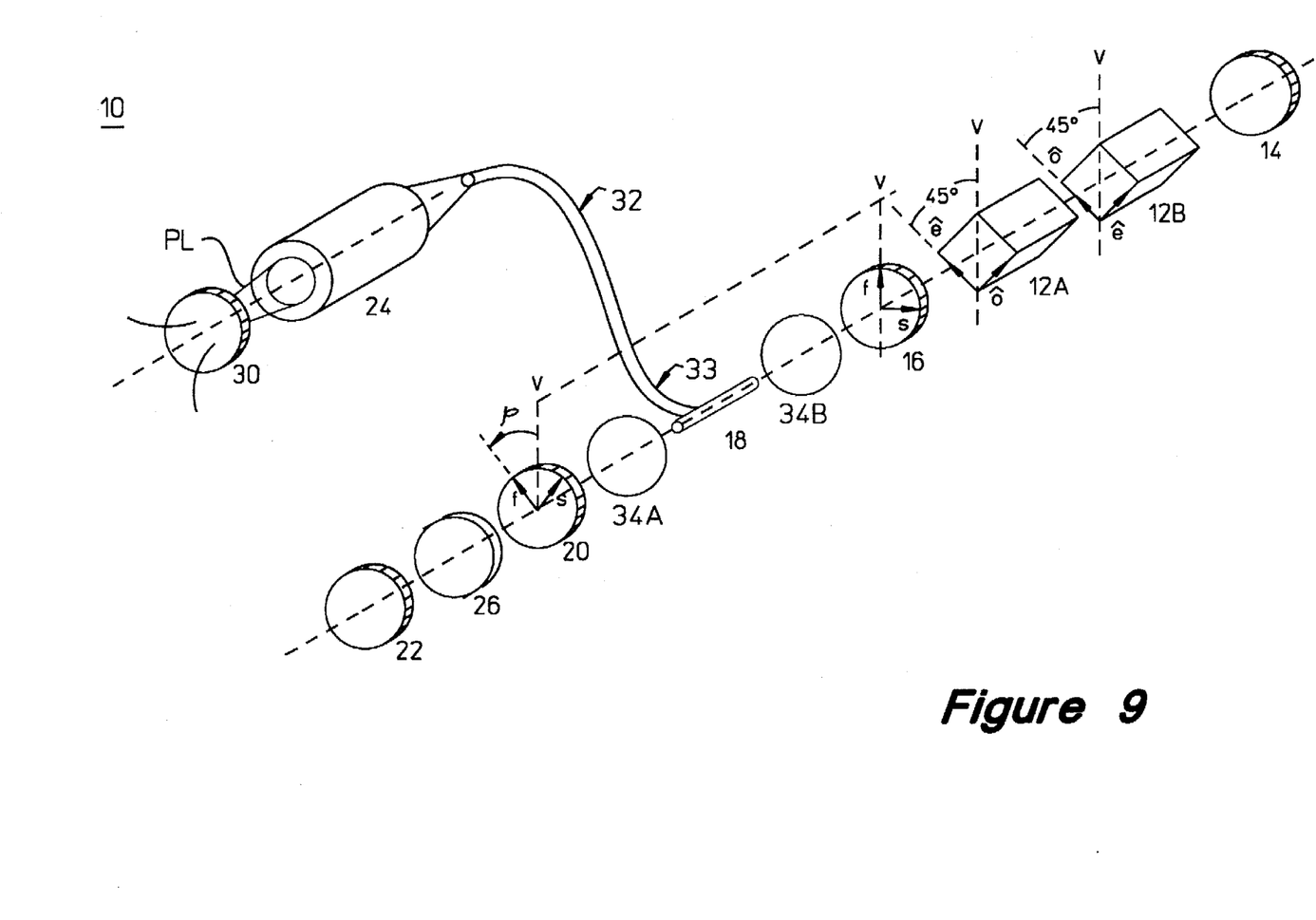
FIG. 9 illustrates another embodiment of FIG. 2.

FIG. 9 illustrates another variation of FIG. 2. A glass fiber optical gain medium acts as the gain medium 18. The fiber is doped with a lasing impurity, such as Erbium or Praseodymium. Other dopants may be used to obtain a variety of fundamental wavelengths. The fiber gain medium is pumped by a laser diode 30 with a pump wavelength appropriate for the absorption band of the dopant material. The pump light is focused into a section of fiber 32 with a coupling optical system. The pump fiber 32 is spliced to the fiber amplifier with a dichroic fiber coupler 33. Since the gain medium is a waveguide, a first and a second intra cavity lens 34A, 34B are used to couple the light at the fundamental into and out of the waveguide.

Figure 10:
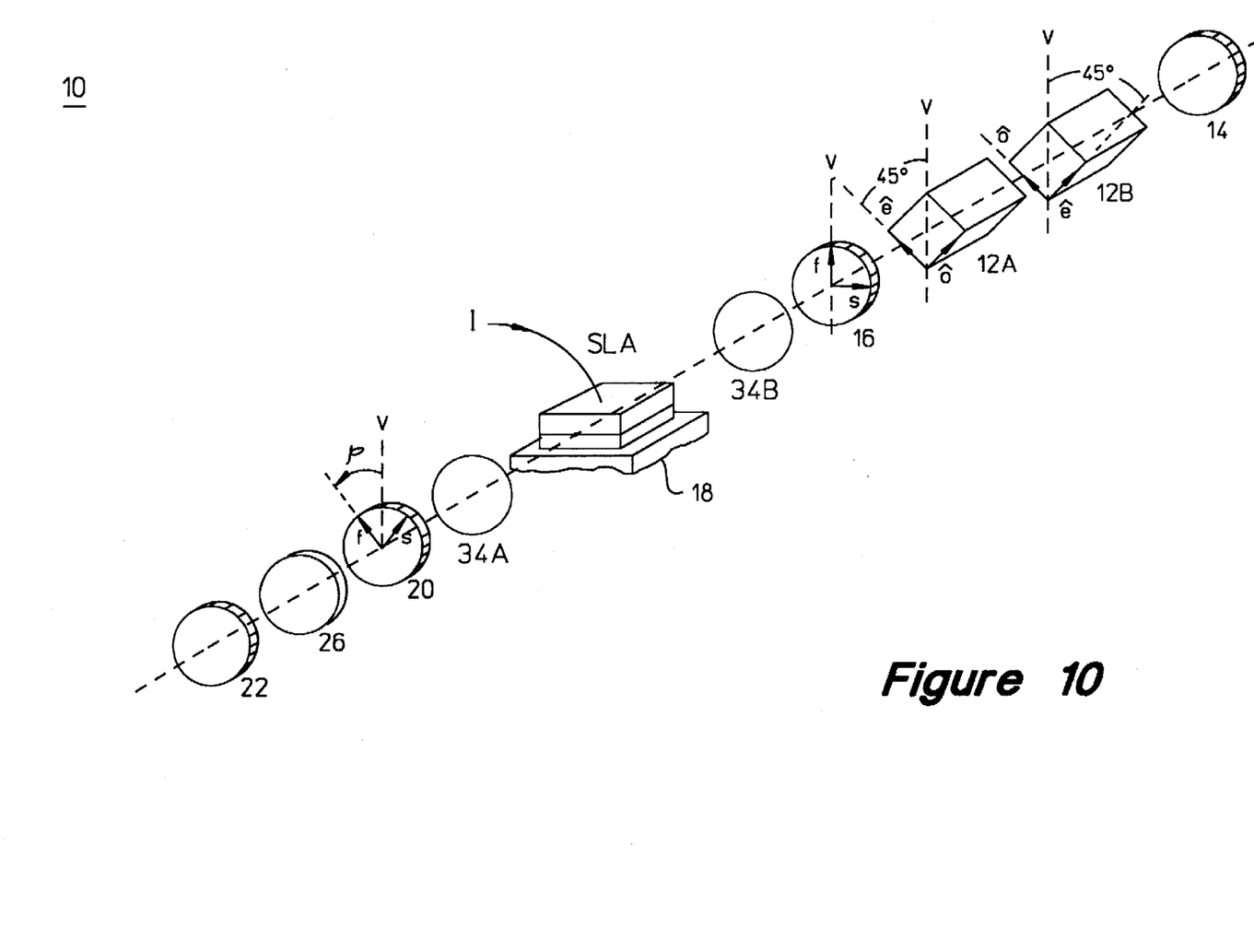
FIG. 10 illustrates another embodiment of FIG. 2.

FIG. 10 illustrates another variation of FIG. 2. The gain medium 18 is a semiconductor optical amplifier, e.g. Dutta, "Optical Amplifiers," Progress in Optics, v. 31, p.202 (1993). The waveguide is designed to be non-birefringent and have polarization-independent gain. The semiconductor optical amplifier is a laser diode with anti-reflection coatings on both facets. The laser requires a first and a second intra cavity coupling lens 32A, 32B. The semiconductor optical amplifier 18 is electrically pumped with an injection current.

I claim:

1. A dual harmonic-wavelength, split-frequency laser comprising:

a pump source outputting energy;

a first and a second mirror;

a first and a second quarter wave plate, the first quarter wave plate positioned adjacent the first mirror, wherein the fast axes of the quarter wave plate are rotated with respect to each other by an adjustable angle about the optical axis of the laser, the second quarter wave plate positioned adjacent the second mirror;

a non-birefringent, polarization-independent gain medium, interposed between the first and the second quarter wave plate, the gain medium receiving energy from the pump source;

a mode-control element, coupled to the gain medium, being operative to cause the laser to oscillate at a first and a second fundamental frequency, wherein the splitting between the first and the second fundamental frequency is controlled by the angle between the fast axes of the first and second quarter wave plates; and two doubling stages, interposed between the first quarter wave plate and the first mirror, wherein the first doubling stage has its extraordinary axis at +45° to the fast axis of the first quarter wave plate and the second doubling stage has its extraordinary axis −45° to the fast axis of the first quarter wave plate.

2. A laser, as defined in claim 1, wherein one of the two doubling crystal stages includes at least M pairs of doubling crystals (M>1) that are collinearly phase matched.

3. A laser, as defined in claim 2, wherein the doubling crystals are birefringent crystals.

4. A laser, as defined in claim 3, one of the M pair of doubling crystals further comprising:

a first doubling crystal having a walkoff angle ρ between the fundamental beam and the second-harmonic beam, the angle being in the plane defined by the extraordinary axis of the crystal and the fundamental beam axis; and a second doubling crystal having a walkoff angle −ρ between the fundamental beam and the second-harmonic beam, the angle being in the plane defined by the extraordinary axis of the crystal and the fundamental beam axis.

5. A laser, as defined in claim 4, wherein the doubling crystals are Type 1 phase matched crystals.

6. A laser, as defined in claim 1, wherein one of the two doubling stages is a Type 1 phase matched crystal.

7. A laser, as defined in claim 1, wherein the optical gain medium is a neodymium-doped yttrium aluminum garnet crystal.

8. A laser, as defined in claim 7, wherein the gain medium is pumped by a laser diode.

9. A laser, as defined in claim 8, wherein the pump light is coupled into the gain medium in an axial geometry.

10. A laser, as defined in claim 7, wherein one of the Type 1 phase matched doubling stages is a magnesium-oxide-doped lithium niobate crystal.

11. A laser, as defined in claim 7, wherein one of the Type 1 phase matched doubling crystal stages is a lithium triborate crystal.

12. A laser, as defined in claim 7, wherein one of the Type 1 phase matched doubling crystal stages includes M pairs of lithium triborate crystals, (M>1).

13. A laser, as defined in claim 1, wherein the optical gain medium is an optical fiber amplifier.

14. A laser, as defined in claim 13, wherein the optical gain medium is pumped by a laser diode.

15. A laser, as defined in claim 14, wherein the laser diode is coupled into the gain medium through a dichroic fiber coupler.

16. A laser, as defined in claim 1, wherein the optical gain medium is a semiconductor optical amplifier.

* * * * *